US012736199B2

(12) United States Patent
Zeuner et al.

(10) Patent No.: US 12,736,199 B2
(45) Date of Patent: Sep. 15, 2026

(54) COMPONENT WITH ELASTIC COMPENSATING ELEMENT FOR MOTOR VEHICLE HEADLIGHT

(71) Applicant: ZKW Group GmbH, Wieselburg (AT)

(72) Inventors: Markus Zeuner, Mank (AT); Alexander Hacker, Wilhelmsburg (AT)

(73) Assignee: ZKW Group GmbH, Wieselburg (AT)

(*) Notice: Subject to any disclaimer, the term of this patent is extended or adjusted under 35 U.S.C. 154(b) by 299 days.

(21) Appl. No.: 18/606,276

(22) Filed: Mar. 15, 2024

(65) Prior Publication Data

US 2024/0310016 A1 Sep. 19, 2024

(30) Foreign Application Priority Data

Mar. 16, 2023 (EP) .................................... 23162428

(51) Int. Cl.

| | |
|---|---|
| ***F21S 41/675*** | (2018.01) |
| ***B60Q 1/04*** | (2006.01) |
| ***B60Q 1/08*** | (2006.01) |
| ***F21S 41/39*** | (2018.01) |
| ***G02B 7/00*** | (2021.01) |

(52) U.S. Cl.

CPC ............ *F21S 41/675* (2018.01); *B60Q 1/045* (2013.01); *B60Q 1/085* (2013.01); *F21S 41/39* (2018.01); *G02B 7/008* (2013.01); *B60Q 2200/34* (2013.01)

(58) Field of Classification Search

CPC ........ F21S 41/675; F21S 41/39; B60Q 1/045; B60Q 1/085; G02B 26/0841; G02B 7/008

See application file for complete search history.

(56) References Cited

U.S. PATENT DOCUMENTS

| | | | | |
|---|---|---|---|---|
| 3,625,796 A | 12/1971 | Graves | | |
| 9,482,842 B2 * | 11/2016 | Erbe | ...................... | G02B 7/026 |
| 2010/0259946 A1 * | 10/2010 | Seiger | .................... | B60Q 1/068 362/548 |

(Continued)

FOREIGN PATENT DOCUMENTS

| | | |
|---|---|---|
| EP | 2279907 A1 | 2/2011 |
| EP | 2693108 A1 | 2/2014 |

OTHER PUBLICATIONS

Extended European Search Report for European Patent Application No. 23162428.9 dated Oct. 17, 2023, (9 Pages).

*Primary Examiner* — Michael Chiang

(74) *Attorney, Agent, or Firm* — Eversheds Sutherland (US) LLP

(57) ABSTRACT

A component (1) for a motor vehicle headlight, wherein the component (1) has a carrier element (2) and a component part (3), wherein the carrier element (2) has a receiving opening (4) configured to receive the component part, wherein the component (1) has at least one elastic compensating element (6), which is arranged in the receiving opening and connects the component part (3) to the carrier element (2) at least in sections, wherein the at least one elastic compensating element (6) comprises a foam material, which is configured to apply a compensating force (F), in response to a thermal deformation of the component part (3), to the component part (3), wherein the compensating force (F) acts along a direction opposite a thermal deformation direction (V) of the component part (3).

20 Claims, 2 Drawing Sheets

(56) References Cited

U.S. PATENT DOCUMENTS

2011/0096314 A1* 4/2011 Sato .................... G03F 7/70825
355/77
2015/0055233 A1* 2/2015 Erbe ...................... G02B 7/181
359/820
2015/0233552 A1* 8/2015 Callens ...................... C09J 7/10
156/329
2023/0055879 A1* 2/2023 Kim ..................... B60Q 1/1407

* cited by examiner

COMPONENT WITH ELASTIC COMPENSATING ELEMENT FOR MOTOR VEHICLE HEADLIGHT

CROSS-REFERENCE TO RELATED APPLICATIONS

This application claims priority to European Patent Application No. 23162428.9, filed Mar. 16, 2023, which is incorporated herein by reference.

FIELD OF THE INVENTION AND DESCRIPTION OF PRIOR ART

The invention relates to a component for a motor vehicle headlight, wherein the component has a carrier element and a component part, in particular a DMD element, wherein the carrier element has a receiving opening configured to receive the component part, wherein the receiving opening is delimited by an edge surface, wherein the component part can be inserted into the receiving opening along an insertion direction and has a side surface, wherein the component part, when inserted into the receiving opening, is arranged relative to the receiving opening in an insertion position in which the side surface of the component part faces the edge surface of the receiving opening, wherein, in the insertion position, a first side surface section of the side surface contacts a first edge surface section of the edge surface and a second side surface section of the side surface has a predetermined minimum distance from a second edge surface section of the edge surface, wherein the carrier element has a support element, on which the component part rests at least in sections in the insertion position in order to be secured against displacement along the insertion direction beyond the insertion position, and wherein the component part has a first temperature in an initial state and a second temperature higher than the first temperature in an operating state, wherein the component is configured to keep the component part in the insertion position in the initial state and in the operating state.

The invention further relates to a motor vehicle headlight comprising a component.

The invention further relates to a method for producing a component.

Generic components, which have a carrier element and a component part inserted therein, are known from the prior art. It is often necessary to keep the component in a certain predetermined position relative to the carrier element whilst the component is in various operating states. The insertion of spacers or similar holding elements has proven insufficient in practice.

SUMMARY OF THE INVENTION

The object of the present invention consists in mitigating or eliminating the disadvantages of the prior art. The objective of the invention is therefore in particular to create a component, which improves the connection of a component part to a carrier element.

This object may be achieved by a component having the features of Claim 1 and with a method having the features of Claim 13. Preferred embodiments may be specified in the dependent claims.

According to the invention, the component has at least one elastic compensating element, which is arranged on a second edge surface section of the edge surface opposite the first edge surface section, wherein the at least one elastic compensating element connects the second edge surface section of the edge surface to the second side surface section of the side surface of the component part, wherein the at least one elastic compensating element comprises a foam material, which is preferably elastic and curable, which is configured to apply a compensating force, in response to a thermal deformation of the component part, to the component part, wherein the compensating force acts along a direction opposite a thermal deformation direction of the component part, wherein the foam material forming the at least one elastic compensating element is configured in such a way that its effective compensating force holds the component part, in particular substantially, in the insertion position during a transition from the initial state to the operating state.

This has the advantage that the position of the component part relative to the carrier element remains substantially the same and that thermal expansion forces that would alter the relative position are compensated for by the compensating element. Two or more compensating elements can also be arranged on the second edge surface section. In particular, at least one or more compensating elements can also be arranged on further edge surface sections, preferably on two further opposite edge surface sections, which respectively generate a further compensating force in the opposite direction to a further deformation direction or further deformation directions. Due to the fact that the at least one compensating element is configured as a preferably curable foam material, the compensating element can be applied to the corresponding edge surface section (or in the case of using several compensating elements to the corresponding edge surface sections) after or before the component part is inserted into the receiving opening, which simplifies the assembly of the component. This is a substantial advantage over solid compensating elements (such as elastic rubber shims) which have to be held in a predetermined position during the insertion of the component part. It is particularly advantageous that the foam material can be inserted into the gap formed between the receiving opening of the carrier element and the component part using an automated method, for example by means of a nozzle controlled by a robot, during the process of assembling the component part. This means that the compensating element does not have to be held and adjusted separately. Displacement of the component part within a main plane, in which the receiving opening and the component part lie, caused by the thermal expansion of the component part and/or carrier element can advantageously be compensated for by the at least one elastic compensating element. In particular, the compensating force and the thermal deformation direction are oriented within the main plane. Thanks to the compensating force exerted by the at least one elastic compensating element, the position of the component part relative to the carrier element remains constant during the transition from the initial state to the operating state. The arrangement of the component part in the receiving opening according to the invention makes it possible in particular to achieve a so-called “fixed bearing/floating bearing” mounting as the component part rests on one side against the receiving opening or contacts the first edge surface section (fixed bearing) and the remaining sides of the receiving opening (the second edge surface section) are spaced apart (floating bearing), wherein at least one compensating element is arranged in the resulting gap. The carrier element can in particular be made of plastic or metal. The component part can, for example, comprise a ceramic material. The component part can comprise in particular a DMD element (“digital micromirror device”; arrangement of micromirror actuators), which can be ceramic or applied to a ceramic substrate. The carrier element is, for example, a carrier frame for a DMD element. In particular, the thermal expansion coefficients of the carrier element and component part preferably differ by a factor of 10-15.

It can be provided that the at least one elastic compensating element is configured to exert a restoring force opposite to the compensating force on the component part during a transition from the operating state to the initial state in order to hold the component part in the insertion position during a transition from the operating state to the initial state.

It can be provided that the minimum distance between the second edge surface section of the edge surface of the receiving opening and the second side surface section of the side surface of the component part is larger in the initial state than in the operating state. This is the same as a reduction of the minimum distance during the transition from the initial state to the operating state, wherein this reduction can be minimized by the force exerted by the compensating elements.

It can be provided that the component part and the carrier element are configured in such a way that in the initial state, the minimum distance is greater than a temperature-related relative change in length of the component part along at least one thermal expansion direction, which is oriented orthogonally to the insertion direction and lies in particular within a main plane defining the receiving opening.

It can be provided that in the insertion position, the component part is inserted in the receiving opening in such a way that in the initial state, the minimum distance along the entire second edge surface section of the edge surface of the receiving opening is substantially the same.

It can be provided that the minimum distance is defined as an orthogonal distance between the side surface of the component part and the edge surface of the receiving opening.

It can be provided that the receiving opening is configured as a through hole formed in the carrier element.

It can be provided that the support element has at least two supporting projections, which are preferably arranged on opposite sides of the receiving opening, wherein the at least two supporting projections extend in the direction of a centre of the receiving opening, wherein in the insertion position, the component part contacts the at least two supporting projections in such a way that a complete penetration of the component part through the receiving opening is blocked.

It can be provided that the component part penetrates the receiving opening at least in sections.

It can be provided that the component part has a first material, which has a first thermal expansion coefficient, and the carrier element has a second material, which has a second thermal expansion coefficient different from the first thermal expansion coefficient such that during a transition from the initial state to the operating state, the thermal expansion of the component part is different, in particular greater, than the thermal expansion of the carrier element.

It can be provided that the foam material is a 2-component polyurethane material, for example FERMAPOR K31, or a single-component sealant, for example based on polyurethane or silicone.

It can be provided that the foam material comprises a material whose elastic behaviour (which is present in particular before hardening) can be described using Hooke's law.

It can be provided that the foam material comprises a material, which has a minimum adhesive force between the edge surface of the receiving opening and/or the side surface of the component part, wherein the minimum adhesive force enables adhesion of the foam material to the edge surface and/or to the side surface at least against the force of gravity.

It can be provided that the carrier element has at least one insertion opening, which is arranged on an outer surface of the carrier element facing away from the edge surface of the receiving opening and extends from the outer surface to the edge surface, wherein the at least one elastic compensating element can be inserted via the insertion opening towards the component part.

It can be provided that the foam material is preferably configured in such a way that it can be introduced into the insertion opening in a feed state with a feed device, wherein the foam material is plastic before and during feeding and can be hardened after feeding, wherein the hardened foam material forms the at least one elastic compensating element.

It can be provided that the second edge surface section of the edge surface has a recess in which the at least one elastic compensating element is accommodated at least in sections.

It can be provided that the second edge surface section of the edge surface has a further elastic compensating element at each of two opposite further sections, wherein preferably the two further sections of the second edge surface section each have a recess in which a further elastic compensating element is accommodated at least in sections, or each have a further insertion opening, via which foam material can be fed to form the elastic compensating elements.

A motor vehicle headlight that comprises a component according to the invention can be provided.

According to the invention, a method for producing a component is provided, wherein the method has the following steps:

a) providing a component (1), comprising a carrier element (2) and a component part (3) inserted therein, wherein the carrier element (2) has a receiving opening (4) configured to receive the component part, wherein the receiving opening (4) is delimited by an edge surface (4*a*), wherein the component part (3) has a side surface (3*a*) and can be inserted into the receiving opening (4) along an insertion direction (x), wherein the component part (3) has a first temperature in an initial state and a second temperature higher than the first temperature in an operating state, wherein the component (1) is configured to keep the component part (3) in the insertion position in the initial state and in the operating state, b) applying, by means of a feed device, at least one elastic compensating element (6) to a second edge surface section (4*a*2) of the edge surface (4*a*) of the receiving opening (4), wherein the at least one elastic compensating element (6) comprises a foam material, which is preferably elastic and curable, wherein the foam material is in a plastic state during application by means of the feed device and hardens after its application in order to form the at least one elastic compensating element (6), and c) inserting the component part (3) into the receiving opening (4), along the insertion direction (x), into an insertion position, wherein, in the insertion position, a first side surface section (3*a*1) of the side surface (3*a*) contacts a first edge surface section (4*a*1) of the edge surface (4*a*) opposite the second edge surface section (4*a*2) and a second side surface section (3*a*2) of the side surface (3*a*) has a predetermined minimum distance from the second edge surface section (4*a*2) of the edge surface (4*a*), wherein, in the inserted state, the at least one elastic compensating element (6) connects the second edge surface section (4a2) of the edge surface (4a) of the receiving opening (4) to the second side surface section (3a2) of the component part (3), wherein the carrier element (2) has a support element (5), on which the component part (3) rests at least in sections in the insertion position in order to be secured against displacement along the insertion direction (x) beyond the insertion position, wherein the hardened foam material is configured to apply a compensating force (F), in response to a thermal deformation of the component part (3), to the component part (3), wherein the compensating force (F) acts along a direction opposite a thermal deformation direction (V) of the component part (3), wherein the foam material forming the at least one elastic compensating element (6) is configured in such a way that its effective compensating force (F) holds the component part (3), in the insertion position during a transition from the initial state to the operating state.

Steps b) and c) can also be carried out in reverse order. In this case, the component part is first inserted into the receiving opening and then the at least one elastic compensating element is applied, wherein after application, the at least one elastic compensating element connects the second edge surface section of the edge surface of the receiving opening to the second side surface section of the component part.

It can be provided that the carrier element has at least one insertion opening, which is arranged on an outer surface of the carrier element facing away from the edge surface of the receiving opening and extends from the outer surface to the edge surface, wherein the feed device is configured, in order to form the at least one elastic compensating element according to step b), to introduce the plastic foam material via the insertion opening towards the component part.

It can be provided that the second edge surface section of the edge surface of the receiving opening has a recess, wherein the feed device is configured, in order to form the at least one elastic compensating element according to step b), to insert the plastic foam material into the recess.

In the context of this description, the terms "above", "below", "horizontal", "vertical" should be understood as indications of orientation when the component is arranged in its normal position of use after having been fitted to a motor vehicle headlight, for example.

DESCRIPTION OF THE FIGURES

The invention is outlined in more detail below based on a preferred exemplary embodiment, to which it is, however, not limited. In the drawings.

DETAILED DESCRIPTION OF EMBODIMENTS OF THE INVENTION

Figure 1:
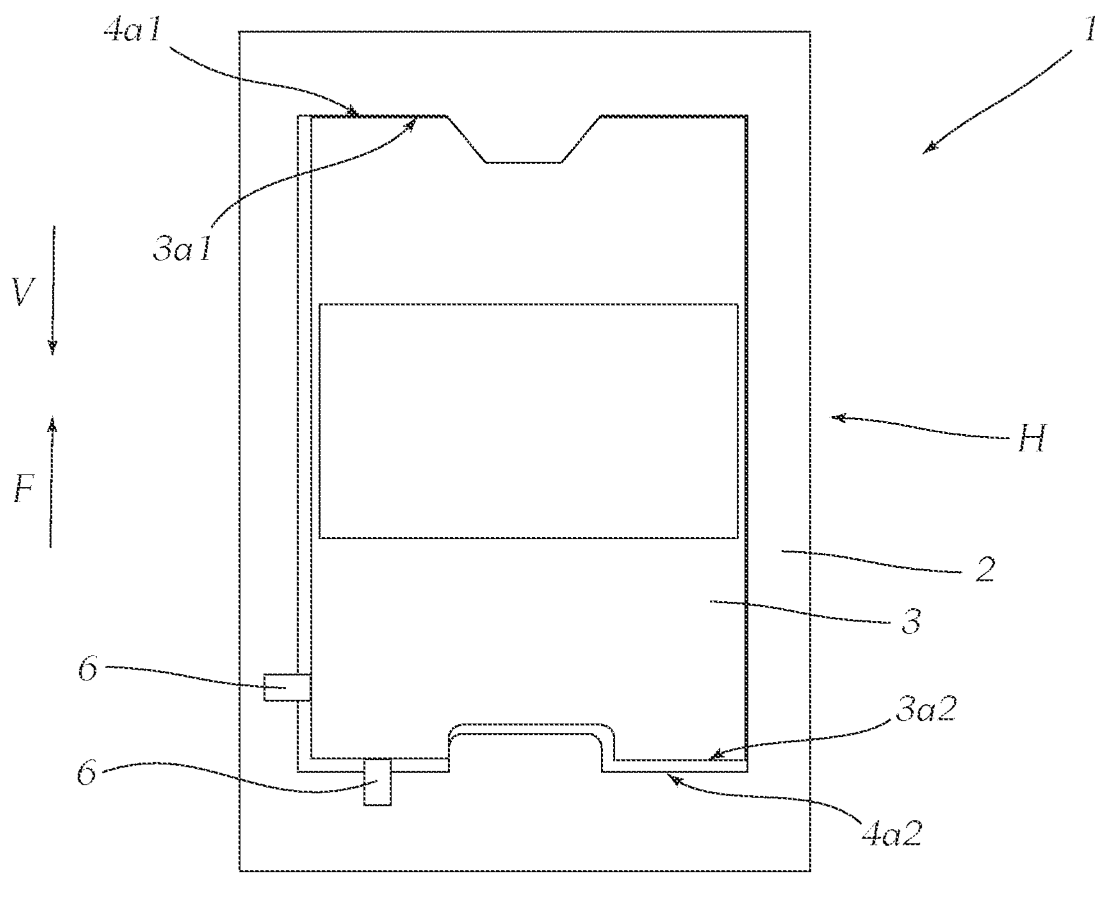
FIG. 1 shows a plan view of an exemplary embodiment of a component according to the invention.

FIG. 1 shows a component 1 for a motor vehicle headlight. The component 1 comprises a carrier element 2 and a component part 3. The carrier element 2 has a receiving opening 4 configured to receive the component part (cf. FIG. 4). The receiving opening 4 is delimited by an edge surface 4a.

The component part 3 can be inserted into the receiving opening 4 along an insertion direction x (in FIG. 1, the insertion direction x is oriented orthogonally to the sheet plane) and has a side surface 3a. The component part 3, when inserted into the receiving opening 4, is arranged relative to the receiving opening 4 in an insertion position in which the side surface 3a of the component part 3 faces the edge surface 4a of the receiving opening 4. In the insertion position, a first side surface section 3a1 of the side surface 3a contacts a first edge surface section 4a1 of the edge surface 4a and a second side surface section 3a2 of the side surface 3a is spaced apart from a second edge surface section 4a2 of the edge surface 4a by a predetermined minimum distance. The minimum distance is defined as an orthogonal distance between the second side surface section 3a2 of the side surface 3a of the component part 3 and the second edge surface section 4a2 of the edge surface 4a of the receiving opening 4. In the insertion position, the component part 3 can be inserted in the receiving opening 4 in such a way that in the initial state, the minimum distance along the entire second edge surface section 4a2 of the edge surface 4a of the receiving opening 4 is substantially the same. The component part 3 and the carrier element 2 can be configured in such a way that in the initial state, the minimum distance is greater than a temperature-related relative change in length of the component part 3 along at least one thermal expansion direction (in particular along the deformation direction V), which is oriented orthogonally to the insertion direction x and lies in particular within a main plane H defining the receiving opening 4. The minimum distance between the second edge surface section 4a2 of the edge surface 4a of the receiving opening 4 and the second side surface section 3a2 of the side surface 3a of the component part 3 is greater in the initial state than in the operating state.

In the exemplary embodiments shown, the receiving opening 4 is configured as a through hole formed in the carrier element, wherein the component part 3 penetrates the receiving opening 4 at least in sections.

The component part 3 has a first temperature in an initial state and a second temperature higher than the first temperature in an operating state. The component 1 is configured to keep the component part 3 in the insertion position in the initial state and in the operating state.

The component part 3 comprises a first material, which has a first thermal expansion coefficient. The carrier element 2 comprises a second material, which has a second thermal expansion coefficient different from the first thermal expansion coefficient. During a transition from the initial state to the operating state, the thermal expansion of the component part 3 is different, in particular greater, than the thermal expansion of the carrier element 2.

The component 1 comprises at least one elastic compensating element 6, which is arranged on a second edge surface section 4a2 of the edge surface 4a opposite the first edge surface section 4a1. The exemplary embodiment shown in FIG. 1 has two compensating elements 6, wherein the second (optional) compensating element 6 is arranged on a further (left) edge surface section, which is adjacent to the second edge surface section 4a2. Several compensating elements 6 can also be arranged on the second edge surface section 4a2, for example. The at least one elastic compensating element 6 connects the second edge surface section 4a2 of the edge surface 4a to the second side surface section 3a2 of the side surface 3a of the component part 3. The at least one elastic compensating element 6 is a foam material, which is preferably elastic and curable. The foam material is configured to apply a compensating force F, in response to a thermal deformation of the component part 3, to the component part 3, wherein the compensating force F acts along a direction opposite a thermal deformation direction V of the component part 3. The foam material forming the at least one elastic compensating element 6 is configured in such a way that its effective compensating force F holds the component part 3 substantially in the insertion position during a transition from the initial state to the operating state.

The at least one elastic compensating element 6 is preferably configured to exert a restoring force opposite to the compensating force F on the component part 3 during a transition from the operating state back to the initial state in order to hold the component part 3 in the insertion position during a transition from the operating state to the initial state. The compensating effect of the elastic compensating element 6 is preferably reversible.

The foam material comprises a material, which has a minimum adhesive force between the edge surface 4 of the receiving opening 4 and/or the side surface 3*a* of the component part 3, wherein the minimum adhesive force enables adhesion of the foam material to the edge surface 4 and/or to the side surface 3*a* at least against the force of gravity.

Figure 2:
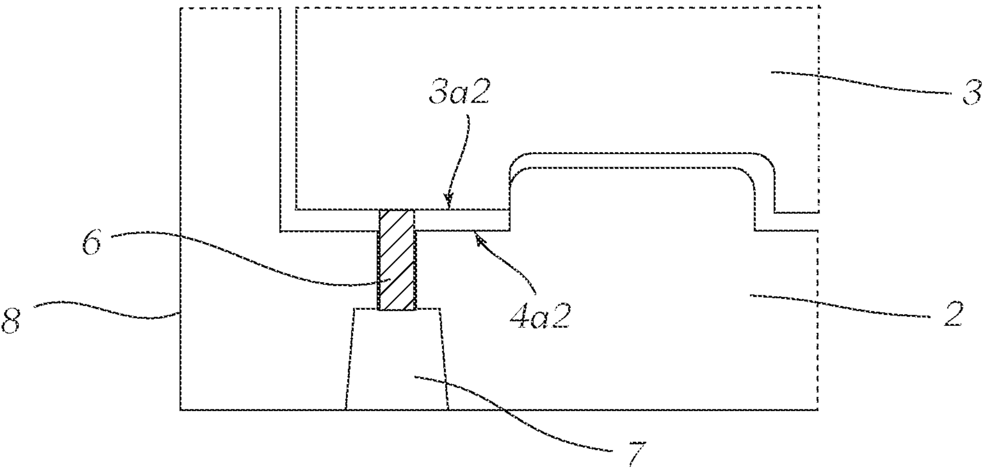
FIG. 2 shows a detail view of FIG. 1.
Figure 3:
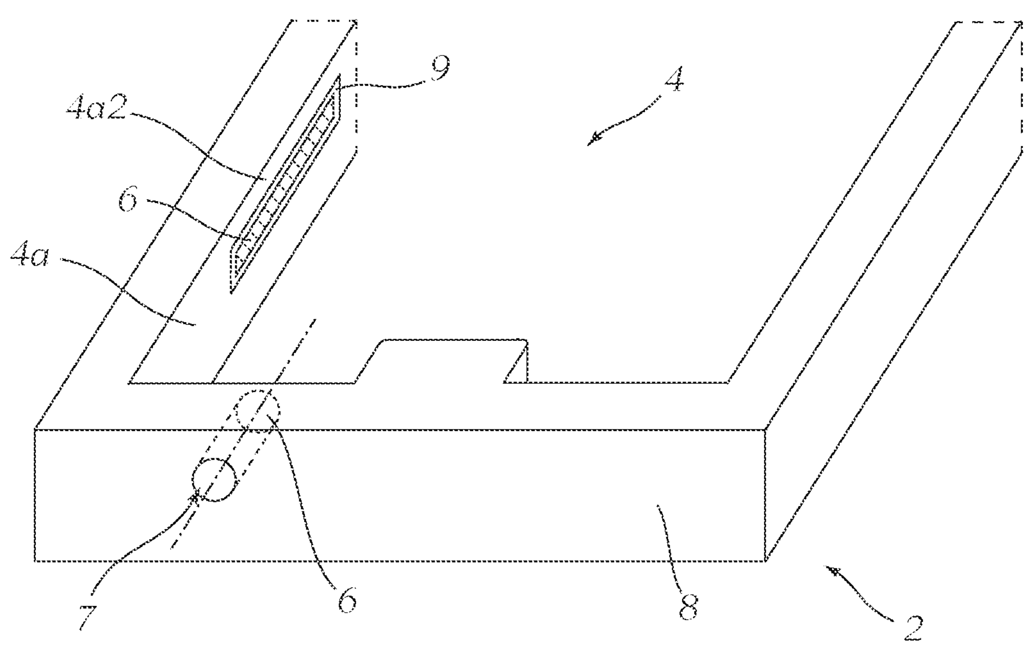
FIG. 3 shows a detail view of a carrier element of the component according to FIG. 1.

In the exemplary embodiment shown in FIGS. 2 and 3, the carrier element 2 has at least one insertion opening 7, which is arranged on an outer surface 8 of the carrier element 2 facing away from the edge surface 4*a* of the receiving opening 4 and extends from the outer surface 8 to the second edge surface section 4*a*2 of the edge surface 4*a*. The at least one elastic compensating element 6 can be inserted via the insertion opening 7 towards to the component part 3. The foam material forming the compensating element 6 is configured in such a way that it can be introduced into the insertion opening 7 in a feed state with a feed device (for example an automated feeder robot), wherein the foam material is plastic before and during feeding and hardened after feeding. The hardened foam material forms the at least one elastic compensating element 6. In the exemplary embodiment according to FIG. 3, the edge surface 4*a* in addition to the insertion opening 7 also has an optional recess 9, in which a further optional compensating element 6 is accommodated.

Figure 4:
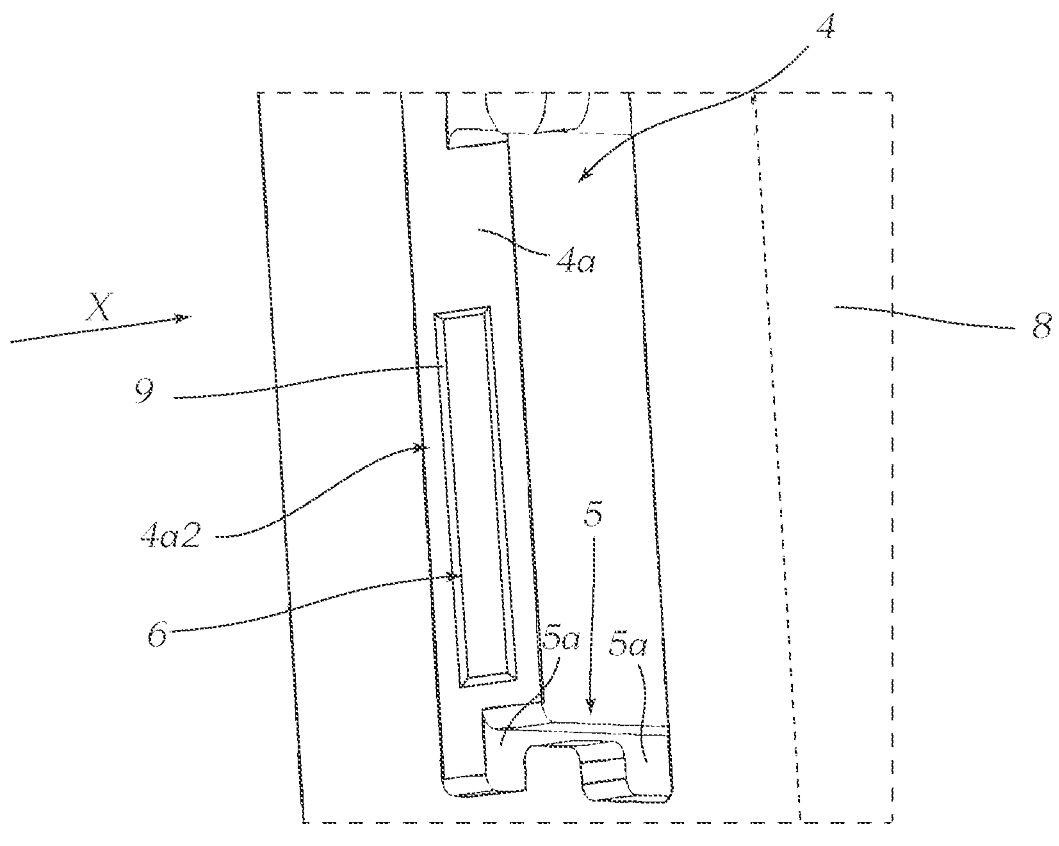
FIG. 4 shows a detail view of a carrier element of a second embodiment.

As shown in FIG. 4, the carrier element 2 has a support element 5, on which the component part 3 rests at least in sections in the insertion position in order to be secured against displacement along the insertion direction x beyond the insertion position. The support element 5 has at least two supporting projections 5*a*, which are preferably arranged on opposite sides of the receiving opening 4, wherein the at least two supporting projections 5*a* extend in the direction of a centre of the receiving opening 4. In the insertion position, the component part 3 contacts the at least two supporting projections 5*a* in such a way that a complete penetration of the component part 3 through the receiving opening 4 is blocked.

In the exemplary embodiment shown in FIG. 4, the second edge surface section 4*a*2 of the edge surface 4*a* has a recess 9 in which the at least one elastic compensating element 6 is accommodated at least in sections. This exemplary embodiment can in particular also have at least one insertion opening 7.

The second edge surface section 4*a*2 of the edge surface 4*a* preferably comprises a further elastic compensating element 6 at each of two opposite further sections. The two further sections of the second edge surface section 4*a*2 preferably each comprise a recess 9 in which a further elastic compensating element 6 is accommodated at least in sections, or the two further sections each comprise a further insertion opening 7, via which foam material can be fed to form the elastic compensating elements 6.

REFERENCE LIST

1 component 1
2 carrier element
3 component part
3*a* side surface
3*a*1 first side surface section
3*a*2 second side surface section
4*a* edge surface
4*a*1 first edge surface section
4*a*2 second edge surface section
support element
6 compensating element
7 insertion opening
8 outer surface
9 recess
F compensating force
V deformation direction
x insertion direction

The invention claimed is:

1. A component (1) for a motor vehicle headlight, the component comprising:

a carrier element (2); and a component part (3), wherein the carrier element (2) has a receiving opening (4) configured to receive the component part, wherein the receiving opening (4) is delimited by an edge surface (4*a*), wherein the component part (3) can be inserted into the receiving opening (4) along an insertion direction (x) and has a side surface (3*a*), wherein the component part (3), when inserted into the receiving opening (4), is arranged relative to the receiving opening (4) in an insertion position in which the side surface (3*a*) of the component part (3) faces the edge surface (4*a*) of the receiving opening (4), wherein, in the insertion position, a first side surface section (3*a*1) of the side surface (3*a*) contacts a first edge surface section (4*a*1) of the edge surface (4*a*) and a second side surface section (3*a*2) of the side surface (3*a*) has a predetermined minimum distance from a second edge surface section (4*a*2) of the edge surface (4*a*), wherein the carrier element (2) has a support element (5), on which the component part (3) rests at least in sections in the insertion position in order to be secured against displacement along the insertion direction (x) beyond the insertion position, wherein the component part (3) has a first temperature in an initial state and a second temperature higher than the first temperature in an operating state, wherein the component (1) is configured to keep the component part (3) in the insertion position in the initial state and in the operating state, wherein the component (1) has at least one elastic compensating element (6), which is arranged on a section of the second edge surface section (4*a*2) of the edge surface (4*a*) opposite the first edge surface section (4*a*1), wherein the at least one elastic compensating element (6) connects the second edge surface section (4*a*2) of the edge surface (4*a*) to the second side surface section (3*a*2) of the side surface (3*a*) of the component part (3), wherein the at least one elastic compensating element (6) comprises a foam material, which is configured to apply a compensating force (F), in response to a thermal deformation of the component part (3), to the component part (3), wherein the compensating force (F) acts along a direction opposite a thermal deformation direction (V) of the component part (3), wherein the foam material forming at least one elastic compensating element (6) is configured in such a way that its effective compensating force (F) holds the component part (3) substantially in the insertion position during a transition from the initial state to the operating state, and wherein the carrier element (2) has at least one insertion opening (7), which is arranged on an outer surface (8) of the carrier element (2) facing away from the edge surface (4*a*) of the receiving opening (4) and extends from the outer surface (8) to the edge surface (4*a*), wherein the at least one elastic compensating element (6) is configured to be inserted via the insertion opening (7) towards the component part (3), wherein the foam material is configured to be introduced into the insertion opening (7) in a feed state with a feed device, wherein the foam material is plastic before and during feeding and can be hardened after feeding, wherein the hardened foam material forms the at least one elastic compensating element (6).

2. The component (1) according to claim 1, wherein the at least one elastic compensating element (6) is configured to exert a restoring force opposite to the compensating force (F) on the component part (3) during a transition from the operating state to the initial state in order to hold the component part (3) in the insertion position during a transition from the operating state to the initial state.

3. The component (1) according to claim 1, wherein the component part (3) and the carrier element (2) are configured in such a way that in the initial state, the minimum distance is greater than a temperature-related relative change in length of the component part (3) along at least one thermal expansion direction, which is oriented orthogonally to the insertion direction (x) and lies within a main plane (H) defining the receiving opening (4).

4. The component (1) according to claim 1, wherein in the insertion position, the component part (3) is inserted in the receiving opening (4) in such a way that in the initial state, the minimum distance along the entire second edge surface section (4*a*2) of the edge surface (4*a*) of the receiving opening (4) is substantially the same.

5. The component (1) according to claim 4, wherein the minimum distance is defined as an orthogonal distance between the second side surface section (3*a*2) of the side surface (3*a*) of the component part (3) and the second edge surface section (4*a*2) of the edge surface (4*a*) of the receiving opening (4).

6. The component (1) according to claim 1, wherein the receiving opening (4) is configured as a through hole formed in the carrier element.

7. The component (1) according to claim 1, wherein the support element (5) has at least two supporting projections (5*a*), wherein the at least two supporting projections (5*a*) extend in the direction of a centre of the receiving opening (4), wherein in the insertion position, the component part (3) contacts the at least two supporting projections (5*a*) in such a way that a complete penetration of the component part (3) through the receiving opening (4) is blocked.

8. The component (1) according to claim 7, wherein the at least two supporting projections (5*a*) are arranged on opposite sides of the receiving opening (4).

9. The component (1) according to claim 1, wherein the component part (3) has a first material, which has a first thermal expansion coefficient, and the carrier element (2) has a second material, which has a second thermal expansion coefficient different from the first thermal expansion coefficient such that during a transition from the initial state to the operating state, the thermal expansion of the component part (3) is different, in particular greater, than the thermal expansion of the carrier element (2).

10. The component (1) according to claim 1, wherein the foam material comprises a material, which has a minimum adhesive force between the edge surface (4) of the receiving opening (4) and/or the side surface (3*a*) of the component part (3), wherein the minimum adhesive force enables adhesion of the foam material to the edge surface (4) and/or to the side surface (3*a*) at least against the force of gravity.

11. The component (1) according to claim 1, wherein the second edge surface section (4*a*2) of the edge surface (4*a*) has a recess (9) in which the at least one elastic compensating element (6) is accommodated at least in sections.

12. A motor vehicle headlight, comprising the component (1) according to claim 1.

13. The component (1) according to claim 1, wherein the component part is a DMD element.

14. The component (1) according to claim 1, wherein the foam material is elastic and curable.

15. A component (1) for a motor vehicle headlight, the component comprising:

a carrier element (2); and a component part (3), wherein the carrier element (2) has a receiving opening (4) configured to receive the component part, wherein the receiving opening (4) is delimited by an edge surface (4*a*), wherein the component part (3) can be inserted into the receiving opening (4) along an insertion direction (x) and has a side surface (3*a*), wherein the component part (3), when inserted into the receiving opening (4), is arranged relative to the receiving opening (4) in an insertion position in which the side surface (3*a*) of the component part (3) faces the edge surface (4*a*) of the receiving opening (4), wherein, in the insertion position, a first side surface section (3*a*1) of the side surface (3*a*) contacts a first edge surface section (4*a*1) of the edge surface (4*a*) and a second side surface section (3*a*2) of the side surface (3*a*) has a predetermined minimum distance from a second edge surface section (4*a*2) of the edge surface (4*a*), wherein the carrier element (2) has a support element (5), on which the component part (3) rests at least in sections in the insertion position in order to be secured against displacement along the insertion direction (x) beyond the insertion position, wherein the component part (3) has a first temperature in an initial state and a second temperature higher than the first temperature in an operating state, wherein the component (1) is configured to keep the component part (3) in the insertion position in the initial state and in the operating state, wherein the component (1) has at least one elastic compensating element (6), which is arranged on a section of the second edge surface section (4*a*2) of the edge surface (4*a*) opposite the first edge surface section (4*a*1), wherein the at least one elastic compensating element (6) connects the second edge surface section (4$a$2) of the edge surface (4$a$) to the second side surface section (3$a$2) of the side surface (3$a$) of the component part (3), wherein the at least one elastic compensating element (6) comprises a foam material, which is configured to apply a compensating force (F), in response to a thermal deformation of the component part (3), to the component part (3), wherein the compensating force (F) acts along a direction opposite a thermal deformation direction (V) of the component part (3), wherein the foam material forming at least one elastic compensating element (6) is configured in such a way that its effective compensating force (F) holds the component part (3) substantially in the insertion position during a transition from the initial state to the operating state, and wherein the second edge surface section (4$a$2) of the edge surface (4$a$) has a further elastic compensating element (6) at each of two opposite further sections, wherein the two further sections of the second edge surface section (4$a$2) each have a recess (9) in which a further elastic compensating element (6) is accommodated at least in sections, or each have a further insertion opening (7), via which foam material can be fed to form the elastic compensating elements (6).

16. The component (1) according to claim 15, wherein the component part is a DMD element.

17. A motor vehicle headlight, comprising the component (1) according to claim 15.

18. A method for producing a component (1), wherein the method has the following steps:

a) providing a component (1), comprising a carrier element (2) and a component part (3) inserted therein, wherein the carrier element (2) has a receiving opening (4) configured to receive the component part, wherein the receiving opening (4) is delimited by an edge surface (4$a$), wherein the component part (3) has a side surface (3$a$) and can be inserted into the receiving opening (4) along an insertion direction (x), wherein the component part (3) has a first temperature in an initial state and a second temperature higher than the first temperature in an operating state, wherein the component (1) is configured to keep the component part (3) in the insertion position in the initial state and in the operating state;

b) applying, by means of a feed device, at least one elastic compensating element (6) to a second edge surface section (4$a$2) of the edge surface (4$a$) of the receiving opening (4), wherein the at least one elastic compensating element (6) comprises a foam material, wherein the foam material is in a plastic state during application by means of the feed device and hardens after its application in order to form the at least one elastic compensating element (6); and c) inserting the component part (3) into the receiving opening (4), along the insertion direction (x), into an insertion position, wherein, in the insertion position, a first side surface section (3$a$1) of the side surface (3$a$) contacts a first edge surface section (4$a$1) of the edge surface (4$a$) opposite the second edge surface section (4$a$2) and a second side surface section (3$a$2) of the side surface (3$a$) has a predetermined minimum distance from the second edge surface section (4$a$2) of the edge surface (4$a$), wherein, in the inserted state, the at least one elastic compensating element (6) connects the second edge surface section (4$a$2) of the edge surface (4$a$) of the receiving opening (4) to the second side surface section (3$a$2) of the component part (3), wherein the carrier element (2) has a support element (5), on which the component part (3) rests at least in sections in the insertion position in order to be secured against displacement along the insertion direction (x) beyond the insertion position, wherein the hardened foam material is configured to apply a compensating force (F), in response to a thermal deformation of the component part (3), to the component part (3), wherein the compensating force (F) acts along a direction opposite a thermal deformation direction (V) of the component part (3), wherein the foam material forming the at least one elastic compensating element (6) is configured in such a way that its effective compensating force (F) holds the component part (3), in the insertion position during a transition from the initial state to the operating state, wherein the carrier element (2) has at least one insertion opening (7), which is arranged on an outer surface (8) of the carrier element (2) facing away from the edge surface (4$a$) of the receiving opening (4) and extends from the outer surface (8) to the edge surface (4$a$), wherein the feed device is configured, in order to form the at least one elastic compensating element (6) according to step b), to introduce the plastic foam material via the insertion opening (7) towards the component part (3).

19. The method according to claim 18, wherein the second edge surface section (4$a$2) of the edge surface (4$a$) of the receiving opening (4) has a recess (9), wherein the feed device is configured, in order to form the at least one elastic compensating element (6) according to step b), to insert the plastic foam material into the recess (9).

20. The method according to claim 18, wherein the foam material of the at least one elastic compensating element applied in step (b) is elastic and curable.

* * * * *